United States Patent [19]
Komori et al.

[11] Patent Number: 5,812,975
[45] Date of Patent: Sep. 22, 1998

[54] STATE TRANSITION MODEL DESIGN METHOD AND VOICE RECOGNITION METHOD AND APPARATUS USING SAME

[75] Inventors: Yasuhiro Komori, Kawasaki; Yasunori Ohora, Yokohoma, both of Japan

[73] Assignee: Canon Kabushiki Kaisha, Tokyo, Japan

[21] Appl. No.: 665,503

[22] Filed: Jun. 18, 1996

[30] Foreign Application Priority Data

Jun. 19, 1995 [JP] Japan .................................. 7-151489

[51] Int. Cl.$^6$ ........................................... G10L 5/06
[52] U.S. Cl. .......................... 704/256; 704/245; 704/255; 704/236; 704/244; 704/243
[58] Field of Search ................. 395/2.65, 2.54, 395/2.45, 2.49, 2.53, 2.52, 2.64

[56] References Cited

U.S. PATENT DOCUMENTS

| | | | |
|---|---|---|---|
| 4,156,868 | 5/1979 | Levinson | 395/2.6 |
| 4,817,156 | 3/1989 | Bahl et al. | 395/2.65 |
| 4,918,731 | 4/1990 | Muroi | 395/2.62 |
| 5,050,215 | 9/1991 | Nishimura | 395/2.65 |
| 5,073,939 | 12/1991 | Vensko et al. | 395/2.65 |
| 5,165,007 | 11/1992 | Bahl et al. | |
| 5,220,629 | 6/1993 | Kosaka et al. | 395/2.69 |
| 5,307,444 | 4/1994 | Tsuboka | 395/2.2 |
| 5,381,514 | 1/1995 | Aso et al. | 395/2.73 |
| 5,444,817 | 8/1995 | Takizawa | 395/2.63 |
| 5,506,933 | 4/1996 | Nitta | 395/2.65 |
| 5,515,475 | 5/1996 | Gupta et al. | 395/2.51 |
| 5,535,305 | 7/1996 | Acero et al. | 395/2.65 |
| 5,608,841 | 3/1997 | Tsuboka | 395/2.65 |
| 5,615,286 | 3/1997 | Patel | 382/224 |
| 5,621,859 | 4/1997 | Schwartz et al. | 395/2.65 |
| 5,638,489 | 6/1997 | Tsuboka | 395/2.65 |

FOREIGN PATENT DOCUMENTS 0237934 9/1987 European Pat. Off. .
0362785 4/1990 European Pat. Off. .

OTHER PUBLICATIONS

S.J. Young & P.C. Woodland, "The Use of State Tying in Continuous Speech Recognition," Eurospeech 93, pp. 2203–2206.

J. Takami & S. Sagayama, "Automatic Generation of Hidden Markov Networks by a Successive State Splitting Algorithm," Institute of Electronics, Information and Communication Engineers, vol. J76–D11, No. 10, pp. 2155–2164, 1993 (Japanese language), together with English equivalent, A successive State Splitting Algorithm for Efficient Allophone Modeling, IEEE, 992, pp. I573–576.

S. Takahashi & Sagayama, "Phoneme HMMs Four–Level Tied–Structure," Institute of Electronics, Information and Communication Engineers, SP94–73, pp. 25–32, 1994 (Japanese language, together with English equivalent, Four–Level Tied–Structure for Efficient Representation of Acoustic Modeling, IEEE 1995, pp. 520–523.

(List continued on next page.)

*Primary Examiner*—David R. Hudspeth
*Assistant Examiner*—Vijay B. Chawan
*Attorney, Agent, or Firm*—Fitzpatrick, Cella, Harper & Scinto

[57] ABSTRACT

A method of designing a state transition model capable of high speed voice recognition and a voice recognition method and apparatus using the state transition model is provided. The methods provide a state transition model in which a state shared structure of the state transition model is designed. The method includes a step of setting the states of a triphone state transition model in an acoustic space as initial clusters, a clustering step of generating a cluster containing the initial clusters by top-down clustering, a step of determining a state shared structure by assigning a short distance cluster among clusters generated by the clustering step, to the state transition model, and a step of learning a state shared model by analyzing the states of the triphones in accordance with the determined state shared structure.

11 Claims, 7 Drawing Sheets

OTHER PUBLICATIONS

J. Takami, "Improvement in Representing Efficiency of Hidden Markov Networks by a State Splitting Merging Algorithm," Acoustic Society of Japan, 1–8–4, pp. 7–8, 1994 (Japanese language only).

ICASSP 88 vol. I, Apr. 11–14, 1988, Large–Vocabulary Speaker–Independent Continuous Speech Recognition Using HMM, Lee, et al. (pp. 123–126).

ICASSP 92, vol. I, Mar. 23–26, 1992, Subphonetic Modeling with Markov States—Senone, Hwang, et al., (pp. I33–I36).

ICASSP 89 vol. I, May 23–26, 1989, "Tied Mixture Continuous Parameter Models for Large Vocabulary Isolated Speech Recognition", Bellegarda, et al. (pp. 13–16).

ICASSP 89, "The Lincoln Robust Continuous Speech Recognizer" Douglas B. Paul, (pp. 449–451).

Van Trees ("detection, Estimation, and Modulation Thoery", Part I, John Wiley &Sons, Jan.1968, pp. 26–29, 126–127).

FIG. 6

RATE OF SUCCESSFUL ANALYSIS (%)

| HMN | NO. OF STATUS | SENTENCE (%) | WORD (%) |
|---|---|---|---|
| PHONE | 75 | 76.4 | 93.9 |
| RIGHT-CONTEXT | 711 | 85.0 | 96.2 |
| TRIPHONE | 9927 | 86.2 | 96.9 |
| NO. OF COMMON STATUS 600 | 600 | 86.6 | 97.3 |

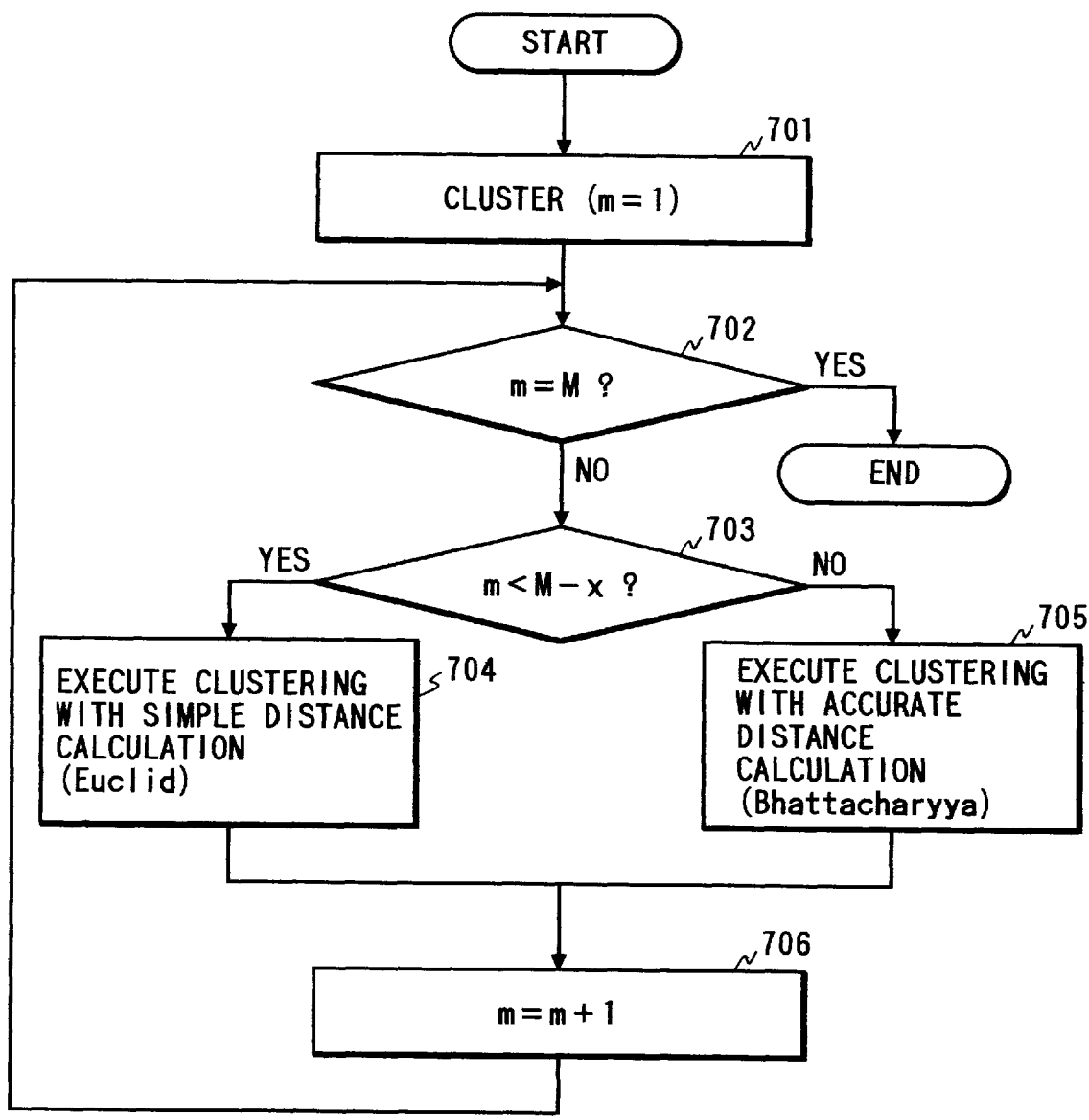

STATE TRANSITION MODEL DESIGN METHOD AND VOICE RECOGNITION METHOD AND APPARATUS USING SAME

BACKGROUND OF THE INVENTION

1. Field of the Invention

The present invention relates to a design method for a state transition model used, for example, for a voice recognition model. The present invention also relates to a voice recognition method and apparatus using a state transition model designed to recognize voices at high speed.

2. Related Background Art

In the following, a hidden Markov model (HMM) is used as a voice recognition model by way of example.

As the speed of a computer has drastically increased, studies on practical uses and the production of voice recognition systems have been made extensively. These systems incorporate HMM which is a statistical model. A triphone HMM has been widely studied because this shows better performance than other HMMs. With this triphone HMM, differences in phone environments such as preceding and succeeding phones are classified finely. This triphone HMM has a number of models so that trainability of data degrades and models of high performance cannot be configured. Furthermore, the amount of computation becomes large in proportion with the number of models, posing a critical issue for real-time voice recognition.

Several methods for solving these problems have been studied basing upon a concept of "shared structure HMM".

(1) A generalized triphone HMM which shares HMMs themselves having similar acoustic characteristics of the whole phone section (K. F. Lee, H. W. Hon, Large-vocabulary speaker-independent continuous speech recognition using HMM, ICASSP88, pp. 123–126)

(2) A shared-state HMM which shares the states of HMMs having similar acoustic characteristics of the whole phone section (Mei-yuh Hwang, X. D. Huang, Subphonetic modelling with Markov States-SENON, ICASSP92, pp. 133–136, S. J. Young, P. Woodland, The use of state tying in continuous speech recognition, Eurospeech 93, pp. 2203–2206, 1993).

(3) A tied mixture HMM which shares the distributions of HMMs having similar acoustic characteristics of the whole phone section (J. Bellegarda, D. Nahamoo, Tied mixture continuous parameter models for large vocabular isolated speech recognition, ICASSP89, pp. 13–16, D. Paul, The Lncoln robust continuous speech recognition, ICASSP89, pp. 449–452).

Of these and others, a shared-state HMM using successive state splitting (SSS) proposed by Takami and realizing both the above (1) and (2) is known as a method of generating a shared-state triphone HMM of high precision because a shared state is determined in a top-down manner while considering phone environments (refer to Takami, Sagayama: "Automatic generation of hidden Markov network by SSS", Papers of the Institute of Electronics, Information and Communication Engineers, J76-DII, No. 10, pp. 2155–2164, 1993).

X. D. Huang, S. J. Young, et al. have proposed a method of generating a shared-state triphone HMM through bottom-up merge and obtained good results. Takahashi, et al. have proposed a method of generating an HMM which method synthesizes the above (1) to (3) (refer to Takahashi, Sagayama: "HMM for four hierarchical-level shared structure", Technical Reports of the Institute of Electronics, Information and Communication Engineers, SP94-73, pp. 25–32, 1994-12).

In this invention, all triphones are prepared and the states of these triphones are clustered. In this context, it is analogous to the methods by X. D. Huang and S. J. Young. However, different from clustering through merge considering only local likelihood, top-down clustering considering the whole acoustic space is performed and this clustering is efficient because of consideration of the whole acoustic space.

Although the same top-down scheme as SSS is used, SSS has an inefficient point that an ending state of one triphone is not shared with a starting state of another triphone because of successive state splitting (SSS). Since voices are generally continuously converted, it can be considered relatively natural that a connectable ending state of a triphone and the starting state of the next triphone are to be shared. The method by S. J. Young considers sharing of only states within a phone class and does not share states between phone classes. These disadvantages of SSS have been solved by Takami by incorporating merge into the processes of successive splitting (refer to Takami, "Efficiency improvement of hidden Marcov network by state splitting method", Papers of Lectures of Acoustical Society of Japan. 1-8-4. pp. 7–8, 1994-10). Takahashi and et al. have solved the above disadvantages by incorporating a tied-mixtured HMM. However, the present inventors consider it more desirable that the above disadvantages are to be solved from the viewpoint of a state level.

Another disadvantage of SSS is that if an arbitrary speaker HMM is generated by successive state splitting, this splitting becomes dependent upon the arbitrary speaker. It is therefore necessary to use a specified speaker in obtaining a state shared structure. This poses other problems that a large amount of data is required for the specified speaker and that it is necessary to use the state shared structure of the specified speaker for other arbitrary speakers.

SUMMARY OF THE INVENTION

The invention has been made under the above circumstances. An object of the present invention is to provide a state transition model design method and apparatus capable of recognizing voices at high speed, and a voice recognition method and apparatus using the state transition mode.

Another object of the present invention is to provide a state transition model design method and apparatus capable of sharing states between phone classes or within a phone class, and a voice recognition method and apparatus using the state transition mode.

Still another object of the present invention is to provide a state transition model design method and apparatus capable of obtaining a state shared structure of phones of an arbitrary speaker and capable of efficiently designing a state transition model, and a voice recognition method and apparatus using the state transition mode.

BRIEF DESCRIPTION OF THE DRAWINGS

FIG. 6 is a table showing the results of recognition of 100 sentences spoken by 10 arbitrary speakers, the recognition being made by using grammars constituted by 1000 words and the voice recognition apparatus of the embodiment.

FIG. 7 is a flow chart illustrating processes by a second embodiment.

DETAILED DESCRIPTION OF THE PREFERRED EMBODIMENTS

Preferred embodiments of the present invention will be described in detail with reference to the accompanying drawings.

The embodiments (inclusive of flow charts) of the invention are reduced to practice under the control of a CPU in accordance with a control program stored in a ROM or RAM. This control program may be stored in a removable storage medium such as a CD-ROM mounted on a voice recognition apparatus.

A method of designing a state shared structure model for voice recognition according to a first embodiment of the invention will be described.

Figure 1:
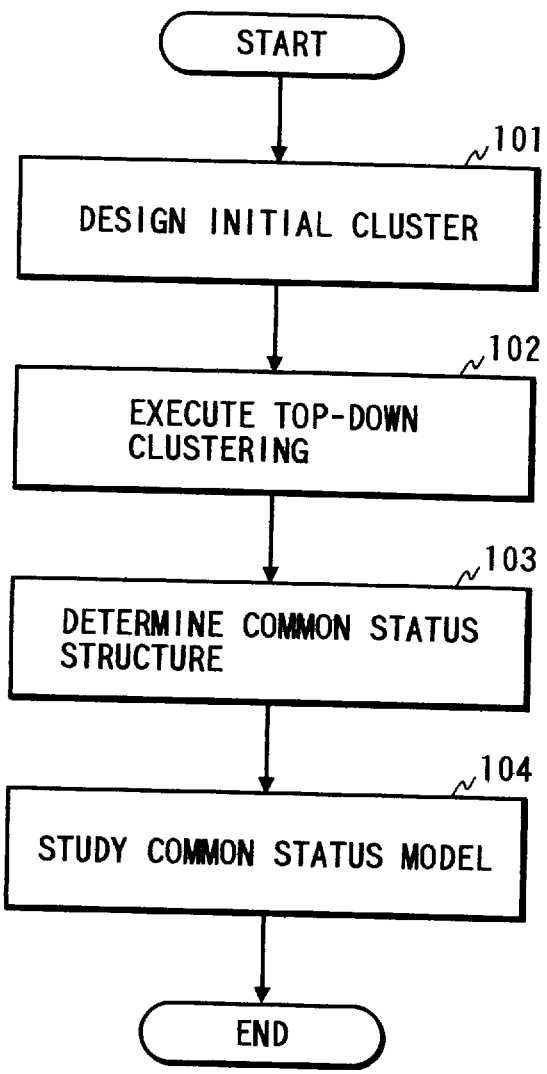
FIG. 1 is a flow chart illustrating processes according to a first embodiment of the invention.

FIG. 1 is a flow chart illustrating the processes of the first embodiment.

Referring to FIG. 1, reference numeral 101 represents a means (process) for designing initial clusters, reference numeral 102 represents a means (process) for top-down clustering, such as general LBG for generating clusters raised to a power of 2, i.e., a means (process) for finely classifying clusters starting from a small number of clusters and sequentially increasing the number of clusters, reference numeral 103 represents a means (process) for determining a common status structure (or state shared structure) of a triphone HMM (modeling considering both preceding and succeeding phones), and reference numeral 104 represents a means (process) for studying (learning) a triphone HMM of the state shared structure.

The details of these means (processes) will be described.
(1) Design of Initial Clusters (101)
(A) All triphone HMMs are learnt using data of an arbitrary speaker.
  (a) Phone HMMs of one distribution are learnt at the proper number of states.
  (b) A right environment type (right-context) HMM is learnt by using the phone HMMs as initial models.
  (c) A both-side environment type (triphone) HMM is learnt by using the right-context HMMs as initial models.
(B) All states of triphone HMMs are used as initial clusters.

Figure 2:
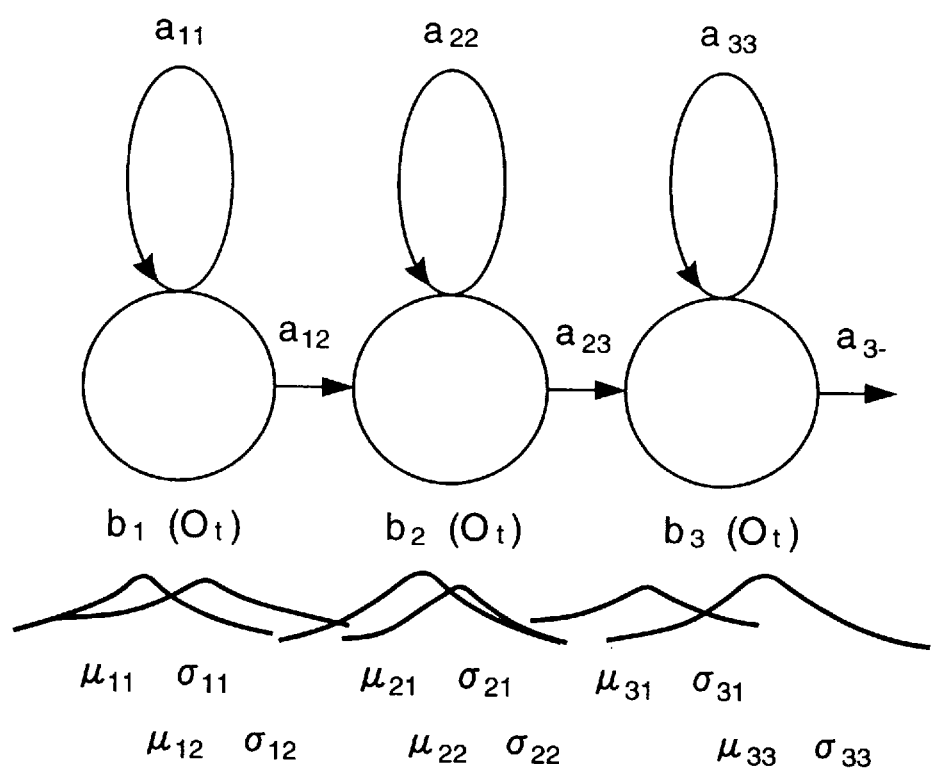
FIG. 2 shows states of an HMM and a state transition model diagram.

FIG. 2 is a diagram illustrating HMM and showing a general state and a state transition model.

In FIG. 2, a state transition probability is indicated by a, an output probability at the corresponding state is indicated by b, a mean value of output probabilities is indicated by $\mu$, and a corresponding dispersion is indicated by $\sigma$.
(2) Top-down Clustering by LBG scheme (102)

The top-down clustering is performed by an LBG scheme using a distance scale considering the output probability distribution. Clustering is defined only by the output probability b which is considered to be an important parameter for obtaining a likelihood to HMMs, by neglecting the state transition probability a.

Figure 3:
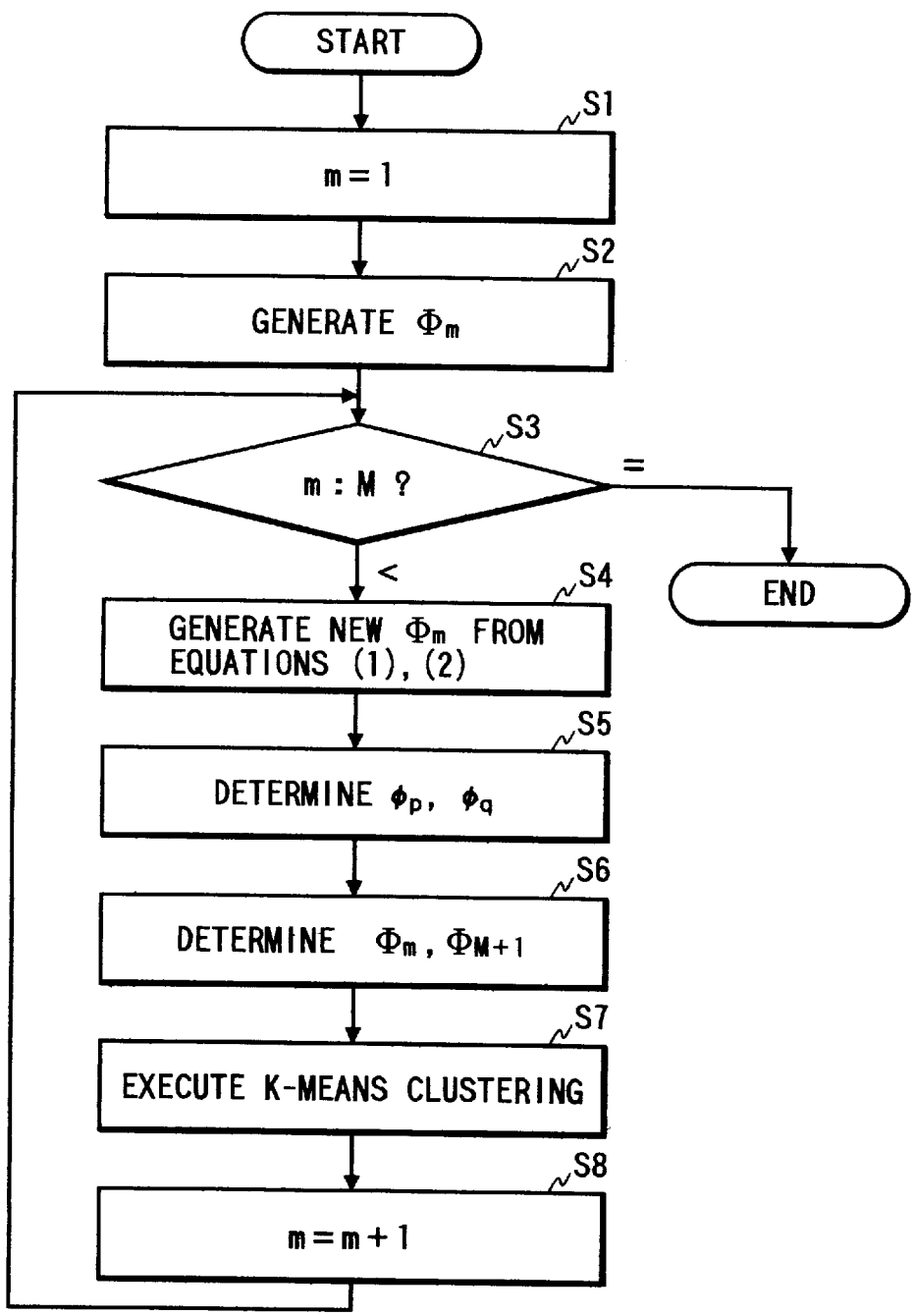
FIG. 3 is a flow chart illustrating top-down clustering processes.

This process is illustrated in the flow chart of FIG. 3.

At Step S1, 1 is set to m. At Step S2, one class $\Phi m$ is generated which contains all initial clusters ($\phi i$). At Step S3 it is checked if the value m is equal to the total number M (e.g., 600) of clusters. If equal, the process is terminated, whereas if not, the process advances to Step S4.

At Step S4, a new cluster $\Phi m$ is generated from all the initial clusters ($\phi i$) belonging to the old cluster $\Phi m$ by using the following equations (1) and (2). Specifically, the new cluster $\Phi m$ is generated by using the mean value $\mu$ of output probabilities and a corresponding dispersion $\sigma$ squared. In the equations, m indicates the cluster number, and N indicates the total number of initial clusters belonging to the class $\Phi m$.

$$\mu_m = \left( \sum_{k \in \Phi m} \mu_k \right) / N \tag{1}$$

$$\sigma_m^2 = \left( \sum_{k \in \Phi m} \sigma_k^2 + \sum_{k \in \Phi m} \mu_k^2 - N \cdot \mu_m^2 \right) / N \tag{2}$$

Next, obtained at Step S5 are an initial cluster $\phi p$, among the initial clusters $\phi i$ belonging to the new cluster $\Phi m$, remotest from the cluster $\Phi m$, and an initial cluster $\phi q$ remotest from the initial cluster $\phi p$. As the distance scale d ($\phi p$, $\phi q$) between the two initial clusters, a Kullback information quantity, a Chernoff distance, a normalized Euclid distance, a Euclid distance, or the like may be used. In this embodiment, a Bhattacharyya distance is used which can be calculated by the following equation (3) in the case of a single Gaussian distribution.

$$d(\phi_p, \phi_q) = \tag{3}$$

$$\frac{1}{8} (\mu_p - \mu_q)^t \left( \frac{\Sigma_p + \Sigma_q}{2} \right)^{-1} (\mu_p - \mu_q) + \frac{1}{2} \ln \frac{|(\Sigma_p + \Sigma_q)/2|}{|\Sigma_p|^{1/2}|\Sigma_q|^{1/2}}$$

where $\mu i$ and $\Sigma i$ indicate a mean value and a dispersion, respectively.

Next, at Step S6, the initial clusters $\phi i$ belonging to the cluster $\Phi m$ are divided into new clusters $\Phi m$ and $\Phi(m+1)$ nearer to the initial clusters $\phi p$ and $\phi q$ obtained at Step S5.

The above process will be described with reference to FIG. 4. In an acoustic space 401, assuming that the cluster $\Phi m$ is positioned generally at the center of the acoustic space 401 and the cluster $\phi p$ is positioned near at the right end of the acoustic space 401, then the cluster $\phi q$ is positioned near at the left end of the acoustic space 401. If the initial clusters $\phi i$ are divided into the new two clusters nearer to the initial clusters $\phi p$ and $\phi q$, the acoustic space 401 is divided at generally the center thereof into two spaces and the total number M of new clusters is two.

At Step S7, K-means clustering is performed for the new clusters $\Phi i$ by using all the initial clusters. This K-means clustering is performed until a preset number of iterations is performed or the total distortion Dm becomes a threshold value or smaller, to search a cluster $\Phi d$ having a maximum total distortion, and d is set to m to return to Step S3.

The total distortion of each cluster can be obtained by the following equation (4).

$$D_m = \sum_{i \in \Phi m} d(\Phi_m, \phi_i) \tag{4}$$

If the total number M of clusters exceeds the preset number (e.g., 600), the process is terminated. In this manner, the shared state of M clusters can be determined.
(3) Determination of a state shared structure of Triphone HMMs (103)

Each state of the triphone HMMs designed at Design of Initial Clusters (101) is assigned a nearest cluster among the clusters designed at Top-down Clustering (102) to determine the state shared structure of triphone HMMs by using the shared state numbers. For judgement of a distance, the Bhattacharyya distance was used and the states were assigned. In this manner, the acoustically nearer states are shared between triphone HMMs or in a single triphone HMM.

Figure 4:
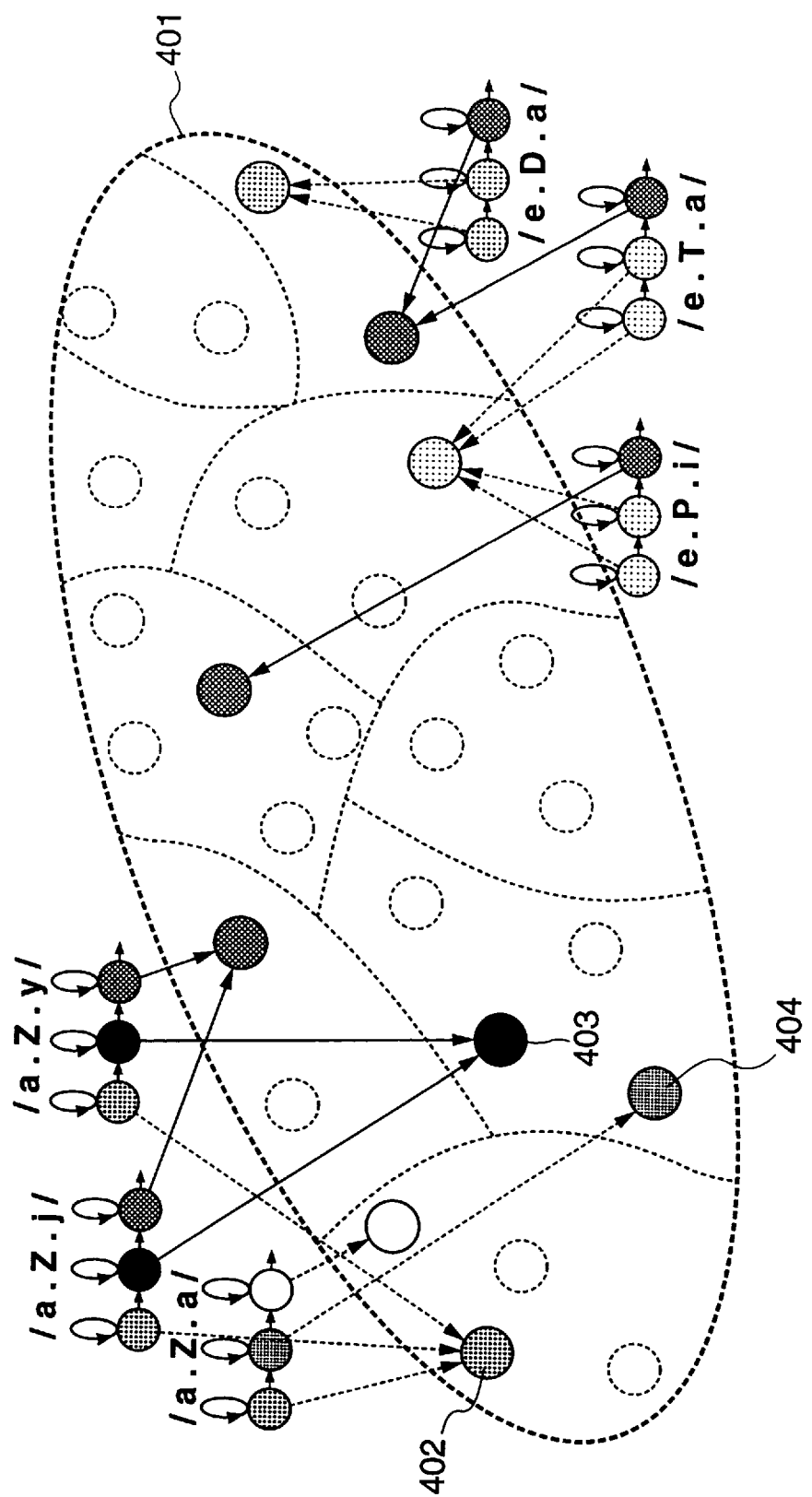
FIG. 4 is a diagram illustrating a state shared type HMM.

In FIG. 4, a symbol such as /a•Z•i/ indicates a single triphone. In the example shown in FIG. 4, a model having three states is shown. This triphone is a phone "Z" having a right phone "1" and a left phone "a". For example, in FIG. 4, the first states of /a•Z•i/, /a•Z•y/, and /a•Z•a/ are represented by the same state 402, the second states of /a•Z•i/ and /a•Z•y/ are represented by the same state 403, and only the second state of /a•Z•a/ and /a•Z•y/ is represented by another state 404. All the first to third states of /a•Z•i/ and /a•Z•y/ are shared by the same state, and so they cannot be discriminated. However, for example, the phone series and triphones of "azia" and "azya" are as follows.

| azia (phones) | a   | z   | i   | a   |
|---------------|-----|-----|-----|-----|
|               | qAz | aZi | zIa | iAq |
| azya (phones) | a   | z   | y   | a   |
|               | qAz | aZy | zYa | yAq |

A silent portion without a phone is represented by q. Since qAz, aZi, and aZy have the same shared state, the two words "azia" and "azya" cannot be discriminated at this point. However, if zIa and zYa, or iAq and yAq, do not have the same state shared structure, the two words can be discriminated at one of these points and there is no problem for practical recognition processes.

In some case (particularly if the total number of shared states is small), all states of triphones having the different middle phones may share the same state. In such a case, if division is necessary, all triphones can be modified to have different acoustic characteristics by assigning a shared state number obtained by adding 1 to the total shared state number, to the state (e.g., middle state) of each triphone to become discriminable.

(4) Learning state shared triphone HMMs (104)

In accordance with the state shared structure determined at (3), the states of triphones are tied to one for performing tied-state learning. This learning may use conventional methods such as EM-algorithm.

Figure 5:
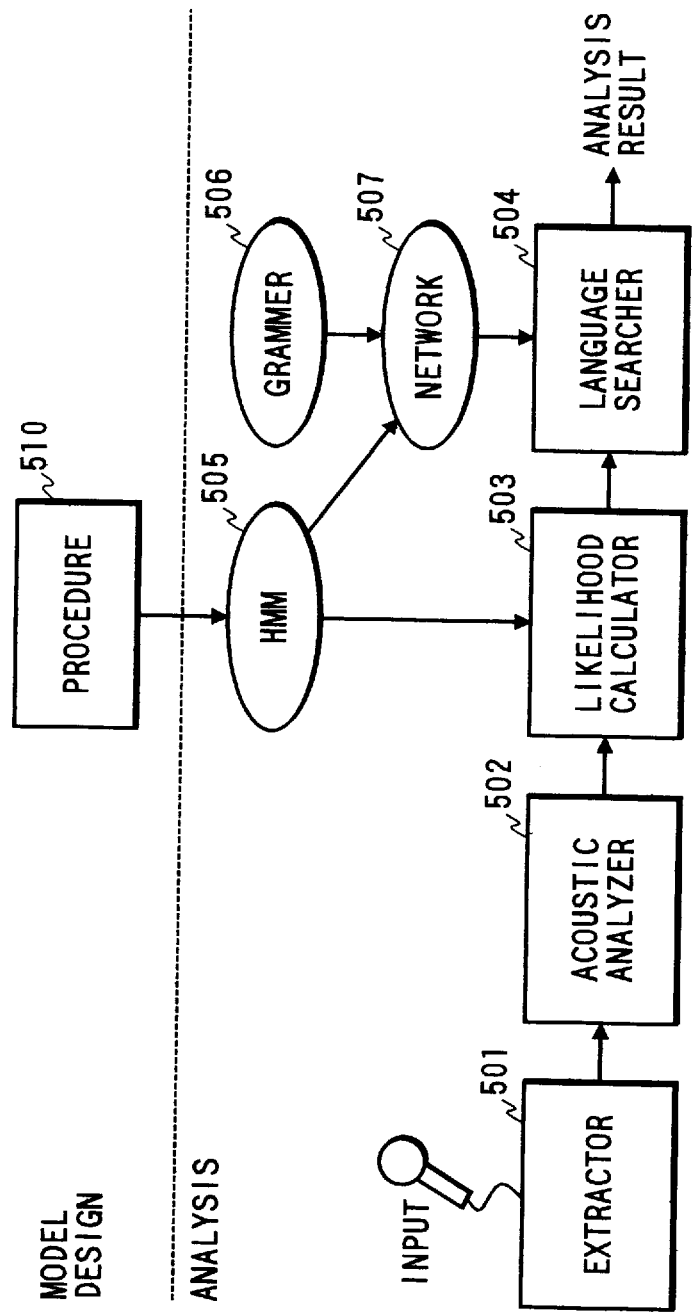
FIG. 5 is a block diagram illustrating a voice recognition process used by a voice recognition apparatus of the embodiment.

FIG. 5 is a block diagram illustrating a voice recognition process used by the voice recognition apparatus of the invention.

In this embodiment, HMMs 505 are generated by the above described procedure 510. A voice section is extracted by an extractor 501 from a voice signal input from a microphone or the like. The extracted voice signal is analyzed by an acoustic analyzer 502. A likelihood calculator 503 obtains a likelihood of each state of HMMs 505. By using the obtained likelihood, a grammar section 506, a voice recognition network 507, and a language searcher 504 searches a language series having the largest likelihood and outputs it as the voice recognition results.

FIG. 6 shows the results of recognition of 100 sentences spoken by 10 arbitrary speakers, the recognition being made by using grammars constituted by 1000 words and the voice recognition apparatus of the embodiment. In FIG. 6, the sentence recognition rate (%) indicates the percentage of sentences whose input voices were all correctly recognized, and the word recognition rate (%) is the percentage of correctly recognized words in a spoken sentence.

As above, with the voice recognition performed by using the state shared structure with 600 shared states in total generated by the procedure of the first embodiment, sentence and word recognition rates much higher than conventional phone HMM, right-context HMM, and triphone HMM were obtained.

Next, the second embodiment of the invention will be described.

The above-described clustering algorithm uses a distance scale considering the dispersion σ. Therefore, if the number of initial clusters φi and the number of final clusters are very large, the amount of calculation is immense. Therefore, if a distance calculation requiring a large amount of calculation for calculating the distances between all clusters is used, a correspondingly longer time is required. In view of this, two calculation types, a simple distance calculation and an accurate distance calculation for calculating accurate distances, are used. The simple distance calculation is used for clusters of a first group starting from the first cluster to an intermediate cluster among the total number of clusters, whereas the accurate distance calculation is used for clusters including the cluster next to the intermediate cluster to the final cluster. In this manner, the time required for distance calculation is shortened and the process can be speeded up. In this second embodiment, the simple distance calculation uses the Euclid distance and the accurate distance calculation uses the Bhattacharyya distance.

FIG. 7 is a flow chart illustrating processes according to the second embodiment.

First, at Step 701, a cluster Φm containing all initial clusters φi is generated. This corresponds to Step S2 in FIG. 3. At Step 701 it is checked whether the total number M of clusters have been obtained. If it is smaller than M, the procedure continues, and if it is M, the procedure is terminated. At Step 703, it is judged whether the next clustering uses the simple distance calculation or the accurate distance calculation. If the number (m) of clusters is smaller than total number M (e.g., 600) of clusters subtracted by x (e.g., 10), i.e., from the first cluster to the 590-th cluster, the flow advances to Step 704 to execute clustering with the simple distance calculation.

If the number (m) of clusters is (M–x) or larger, the flow advances to Step 705 to execute clustering with the accurate distance calculation to the final cluster M. The processes at Steps 704 and 705 are different in their calculation methods and correspond to Steps S4 to S7 of FIG. 3. Namely, Step 705 uses the Bhattacharyya distance and are the same processes at Steps S4 to S7 of FIG. 3, and Step 704 uses the Euclid distance and calculates the distances at Steps S4 to S7 by the Euclid distance. After Step 704 or 705, one cluster is added at Step 706 and the flow returns to Step 702.

The distance calculation in this embodiment may use other distances different from the Bhattacharyya distance and Euclid distance.

In the above embodiments, HMM is used as the voice recognition model. Instead of HMM, other models may be used if they are state transition models having distributions. Although the triphone is used as a model unit, the recognition unit may be music or other information.

In the above embodiments, although voice recognition is used, the above embodiment procedures are applicable to the model design of pattern recognition by using models having similar distributions.

The invention is applicable to a system having a plurality of equipments and to a single equipment. The invention is applicable to a program embodying the invention and supplied to a system or equipment.

As described so far, the features of the embodiments reside in (1) that clusters are generated through top-down clustering considering the whole acoustic space, (2) that states can be shared between phone classes and in each phone class, and (3) a state shared structure of an arbitrary speaker can be generated directly. Therefore, a triphone HMM of an efficient state shared structure can be designed through top-down clustering. By using the voice recognition model designed by the procedures of the invention, high speed and high performance voice recognition can be realized.

What is claimed is:

1. A method of recognizing patterns in an input speech signal using a designed state transition model in which a state shared structure of the state transition model is designed, the method comprising:

a step of inputting a speech signal;

a step of recognizing patterns in the input speech signal using a designed state transition model, the designing of the state transition model comprising:

a step of setting the states of a triphone state transition model in an acoustic space as initial clusters;

a clustering step of generating a cluster containing said initial clusters by top-down clustering;

a step of determining a state shared structure by assigning a short distance cluster among clusters generated by said clustering step, to the state transition model; and a step of learning a state shared model by analyzing the states of the triphones in accordance with the determined state shared structure; and a step of outputting a speech signal representing the pattern recognized in said recognizing step.

2. A method according to claim 1, wherein said clustering step executes clustering to generate a predetermined number of clusters by a Euclid distance calculation, and after generating the predetermined number of clusters, to generate clusters by accurate distance calculation.

3. A method according to claim 2, wherein said accurate distance calculation uses a Bhattacharyya distance.

4. A method according to claim 1, wherein said clustering step is defined by an output probability of states.

5. A computer usable medium having computer readable program code means embodied therein for causing a computer to store information on a method of designing a state transition model in which a state shared structure of the state transition model is designed, the computer readable program code means comprising:

first computer readable program code means for causing the computer to input a speech signal;

second computer readable program code means for causing the computer to recognize patterns in the input speech signal using a designed state transition model, said second computer readable program code means comprising means for causing the computer to design the state transition model comprising:

third computer readable program code means for causing the computer to set the states of a triphone state transition model in an acoustic space as initial clusters;

fourth computer readable program code means for causing the computer to generate a cluster contain the initial clusters by top-down clustering;

fifth computer readable program code means for causing the computer to determine a state shared structure by assigning a short distance cluster among clusters caused to be generated by the computer by said fourth computer readable program code means, to the state transition model; and sixth computer readable program code means for causing the computer to learn a state shared model by analyzing the states of the triphones in accordance with the determined state shared structure; and seventh computer readable program code means for causing the computer to output a speech signal representing the recognized pattern the computer is caused to recognize by said second computer readable program code means.

6. A voice recognition apparatus using a state transition model, comprising:

input means for inputting a speech signal containing voice information;

processing means for processing the speech signal, said processing means comprising analyzing means for analyzing the voice information contained in the input speech signal input from said input means;

likelihood generating means for generating a likelihood signal using the voice information analyzed by said analyzing means and the state transition mode;

means for determining a language series responsive to the likelihood signal and outputting an electrical signal representing a recognition result comprising the determined language series; and means for determining the state transition model comprising:

means for setting the states of a triphone state transition model in an acoustic space as initial clusters;

means for generating a cluster containing said initial clusters by top-down clustering;

means for determining a state shared structure by assigning a short distance cluster among clusters generated by said cluster generating means, to the state transition model; and means for learning a state shared model by analyzing the states of the triphones in accordance with the determined state shared structure.

7. A voice recognition apparatus according to claim 6, wherein the top-down clustering generates a recognition model by executing clustering to generate a predetermined number of clusters by a Euclid distance calculation, and after generating the predetermined number of clusters, to generate clusters by accurate distance calculation.

8. A voice recognition apparatus according to claim 7, wherein said accurate distance calculation uses a Bhattacharyya distance.

9. A voice recognition apparatus according to claim 6, wherein the top-down clustering is defined by an output probability of states.

10. A voice recognition method using a state transition model, comprising:

an input step of inputting a speech signal containing voice information;

a processing step of processing the electrical signal, said processing step comprising an analyzing step of analyzing the voice information contained in the input speech signal input by said input step;

a likelihood signal generating step of generating a likelihood signal using the voice information analyzed by said analyzing means and the state transition mode;

a step of determining a language series responsive to the likelihood signal and outputting a speech signal representing a recognition result comprising the determined language series; and a step of determining the state transition model comprising:

a step of setting the states of a triphone state transition model in an acoustic space as initial clusters;

a step of generating a cluster containing said initial clusters by top-down clustering;

a step of determining a state shared structure by assigning a short distance cluster among clusters generated by said cluster generating step, to the state transition model; and a step of learning a state shared model by analyzing the states of the triphones in accordance with the determined state shared structure.

11. A computer usable medium having computer readable program code means embodied therein for causing a computer to store information on a voice recognition method using a state transition model, the computer readable program code means comprising:

first computer readable program code means for causing the computer to input a speech signal containing voice information;

second computer readable program code means for causing the computer to process the speech signal, said second computer readable program code means causing the computer to analyze the voice information contained in the input speech signal caused to be input by said first computer readable program code means;

third computer readable program code means for causing the computer to generate a likelihood signal using the voice information analyzed by said analyzing means and the state transition mode;

fourth computer readable program code means for causing the computer to determine a language series responsive to the likelihood signal and to output a speech signal representing a recognition result comprising the determined language series; and fifth computer readable program code means for causing the computer to determine the state transition model comprising:

sixth computer readable program code means for causing the computer to set the states of a triphone state transition model in an acoustic space as initial clusters;

seventh computer readable program code means for causing the computer to generate a cluster containing said initial clusters by top-down clustering;

eighth computer readable program code means for causing the computer to determine a state shared structure by assigning a short distance cluster among clusters caused to be generated by the computer by said seventh computer readable program code means, to the state transition model; and ninth computer readable program code means for causing the computer to learn a state shared model by analyzing the states of the triphones in accordance with the determined state shared structure.

* * * * *

UNITED STATES PATENT AND TRADEMARK OFFICE
CERTIFICATE OF CORRECTION

PATENT NO.  : 5,812,975

DATED       : September 22, 1998

INVENTOR    : YASUHIRO KOMORI, ET AL.

It is certified that error appears in the above-identified patent and that said Letters Patent is hereby corrected as shown below:

<u>COLUMN 1</u>,
Line 47, "Lncoln" should read --Lincoln--.

<u>COLUMN 4</u>,
Line 30, " $(\underline{\Sigma_p + \Sigma_q})^1$ should read -- $(\underline{\Sigma_p + \Sigma_q})^{-1}$ --.
              $2$                             $2$ <u>COLUMN 5</u>,
Line 31, "case" should read --cases--.
Line 55, "searches" should read --search--.
Line 56, "outputs" should read --output--.

<u>COLUMN 7</u>,
Line 57, "contain" should read --containing--.

Signed and Sealed this

Twenty-first Day of September, 1999

Attest:

Q. TODD DICKINSON

*Attesting Officer*    Acting Commissioner of Patents and Trademarks